United States Patent [19]

Salsburg

[11] Patent Number: 5,088,058
[45] Date of Patent: Feb. 11, 1992

[54] APPARATUS AND METHOD FOR EVALUATING AND PREDICTING COMPUTER I/O PERFORMANCE USING I/O WORKLOAD SNAPSHOTS FOR MODEL INPUT

[75] Inventor: Michael A. Salsburg, West Chester, Pa.

[73] Assignee: Unisys Corporation, Detroit, Mich.

[21] Appl. No.: 237,120

[22] Filed: Aug. 26, 1988

[51] Int. Cl.⁵ .................. G06F 15/36; G06F 15/40; G06F 15/46
[52] U.S. Cl. .................................. 364/500; 364/578; 364/554; 364/150; 364/933.8; 364/921.8; 364/921.91; 364/921.9; 364/916.3; 364/221.2; 364/221.4; 364/243.41; 364/232.3; 364/DIG. 1; 364/DIG. 2
[58] Field of Search ............... 364/578, 148, 149, 150, 364/554, 200, 900

[56] References Cited

U.S. PATENT DOCUMENTS

| | | | |
|---|---|---|---|
| 3,344,406 | 11/1964 | Vinal | 364/900 |
| 4,213,175 | 7/1980 | Kurihara | 364/150 |
| 4,443,861 | 4/1984 | Slater | 364/900 |
| 4,476,526 | 10/1984 | Dodd | 364/200 |
| 4,648,065 | 3/1987 | Zenk et al. | 364/200 |
| 4,725,968 | 2/1988 | Baldwin et al. | 364/550 |
| 4,773,028 | 9/1988 | Tallman | 364/150 |
| 4,858,147 | 8/1989 | Conwell | 364/200 |
| 4,977,529 | 12/1990 | Gregg et al. | 364/578 |

OTHER PUBLICATIONS

Anthony Ralston, Editor, Encyclopedia of Computer Science, First Edition, Van Nostrand Reinhold Co., 1976, pp. 935-939, 1063-1070, 1187-1189, 1214-1215, 1259-1277 and 1329-1331.

Michael A. Salsburg, "Disk Cache Performance Modeling", Part I, Unisphere, Nov. 1987, pp. 30-36.

Michael A. Salsburg, "Disk Cache Performance Modeling", Part II, Unisphere, Dec. 1987, pp. 40-46 and 78.

Michael A. Salsburg, "A Statistical Approach to Computer Performance Modeling", Sigmetrics, May 11, 1987 pp. 155-162.

M. A. Salsburg, "Examining RPS Delays-Is Your Slip Showing?", CMG Transactions, Spring 1987, pp. 15-24.

Disk Operations Training Guide #1221050, A Series Capacity Management Facility Unisys, Mar. 1988.

Primary Examiner—Thomas C. Lee
Assistant Examiner—Mehmet Geckil
Attorney, Agent, or Firm—Nathan Cass; Mark T. Starr

[57] ABSTRACT

A method of evaluating and predicting the performance of an I/O disk system comprised of one or more disk controllers and cooperating disk units using a simulation model containing a stact constructed such that delays are formulated as sets of stochastic processes. The simulation model includes at least one statistical submodel and has delay parameters which are settable in accordance with a selectable I/O disk configuration. The simulation model is driven by a selectable I/O workload snapshot grouped into I/O batches. The simulation model provides both overall and batch output data in response to the I/O workload snapshot. Provision is also made for the simulation model to take into account the presence of cache storage in the selected I/O configuration.

10 Claims, 5 Drawing Sheets

APPARATUS AND METHOD FOR EVALUATING AND PREDICTING COMPUTER I/O PERFORMANCE USING I/O WORKLOAD SNAPSHOTS FOR MODEL INPUT

BACKGROUND AND SUMMARY OF THE INVENTION

The present invention relates to improved means and methods for evaluating, modeling, simulating, and predicting input-output (I/O) performance in a computer system.

The current direction of computer applications continues to approach a real-time environment in which the computing system is expected to respond quickly to end-user requests. The amount of delay from the moment a user makes a request to the moment the result is received (response delay) has become an important basis for evaluating computer performance. In today's environment of increasing processor speeds, the largest proportion of application wait time is due to I/O delays. Thus, the need for accurate and reliable means and methods for evaluating and predicting I/O delays has become more important than ever before.

The primary way of evaluating and predicting computer I/O performance has been to develop computer performance models. Such models have traditionally been developed using either probabilistic evaluation (analytic models) or discrete event simulation programs (simulation models).

An analytic model may be defined to be a model that accepts moment estimators (such as mean arrival and service times) as its input and, using a closed form or iterative method, produces moment estimators for the desired statistics (such as average wait time). Analytic modeling has focused on problems of queueing systems. Queueing network modeling has been evolving since the mid 1960s. It has been useful in providing solutions to many questions regarding computer performance. Although queueing systems are a subset of discrete systems, analytic modeling has been proven to be applicable in a wide range of computer performance evaluation problems and is the primary method used commercially today. The advantage of analytic modeling is in the low processor requirement. For models that are applicable to analytic modeling, runs can be performed in minutes, where simulation model requirements would be prohibitive.

However, there are some fundamental drawbacks to analytic modeling. A basic drawback is that not all discrete system can be evaluated. Furthermore, direct measurements have shown that many computer systems seriously violate the underlying assumptions of analytic models. I/O systems present a particular problem in this regard because of the large quantity and diverse nature of today's I/O workloads which create arrival and service distributions which are not only extremely variable, but also do not conform to those conventionally assumed for these models, thereby severely limiting the accuracy and reliability of the results obtained, while also limiting the ability to predict the performance of different I/O configurations. Also, the actual distributions of the analytic modeling parameters must often be simplified which further compromises accuracy. In addition, many systems that can be evaluated are intractable in that the calculations and memory requirements may grow non-linearly.

Simulation models are primarily useful to study computer performance at a high level of detail. A simulation model may be defined to be a model which accepts a set of measured or generated events (such as arrival or service requests) as its input and produces performance data corresponding thereto. Unfortunately, the level of detail is proportional to the processor requirements needed to sufficiently run the simulation. Thus, simulation is rarely used commercially because of the inordinate amount of processor time required to produce performance data. Furthermore, as is the case for analytic modeling, the ability of simulation models to predict the performance of different I/O configurations is severely limited because of the large quantity and diverse nature of modern-day I/O workloads.

Statistical techniques have been used in the prior art to augment and assist conventional analytic and simulation approaches, and also to aid in their evaluation. Statistical techniques have also been used to provide a submodel portion of an overall I/O simulation model. While such usage of statistical modeling offers the possibility of reducing the complexity and processor requirements of simulation models, it does not provide a solution to the predictability problem mentioned above.

In accordance with the present invention, improved means and methods are provided for computer I/O evaluation and prediction using a simplified simulation model which, to a significant extent, overcomes the drawbacks of presently known modeling approaches. This is achieved in a preferred embodiment of the invention by using I/O workload snapshots derived from actual measured customer I/O disk workloads for model input in conjunction which a simplified simulation model of a disk system which employs a combination of analytic, simulation and statistical modeling techniques to reduce processing time, and which operates to calculate I/O workload delays from the I/O snapshots on an individual basis, whereby in accordance with the invention, an unexpectedly fast simulation evaluate the performance of a particular disk system configuration as well as accurately predict the effect on performance of making changes in the configuration. The provision of such a model permits a user to effectively explore various solutions to disk performance problems and to choose a solution which will provide the needed performance.

The specific nature of the invention including its objects, features and advantages will become evident from the more detailed description provided herein taken in conjunction with the accompanying drawings.

DETAILED DESCRIPTION OF THE INVENTION

Like numerals refer to like elements throughout the figures of the drawings.

As an aid in understanding the description to follow, reference may be had to the following publications, the pertinent contents of which are hereby incorporated herein by reference:

*Encyclopedia of Computer Science*, first edition, A. Ralston, Editor, Van Nostrand Reinhold Co., 1976, pp. 935-9, 1063-70, 1187-9, 1214-5, 1259-77 and 1329-31.

*A Statistical Approach to Computer Performance Modeling*, M. A. Salsburg, SIGMETRICS, MAY 11, 1987, pp. 155-162

*Examining RPS Delays—Is Your Slip Showing?*, M. A. Salsburg, CMG Transactions, Spring 1987, pp. 15-24

*Disk Cache Performance Modeling*, M. A. Salsburg CMG, 1987, pp. 424-431

*Unisys A Series Capacity Management Facility. Disk Operations Guide* #1221050, March 1988

*Unisys A Series Capacity Management Facility. Disk Operations Training Guide* #1221050, March 1988

*Benchmarking the I/O System*, M. A. Salsburg, CMG Transactions, Winter 1988, pp. 25-31

Figure 1:
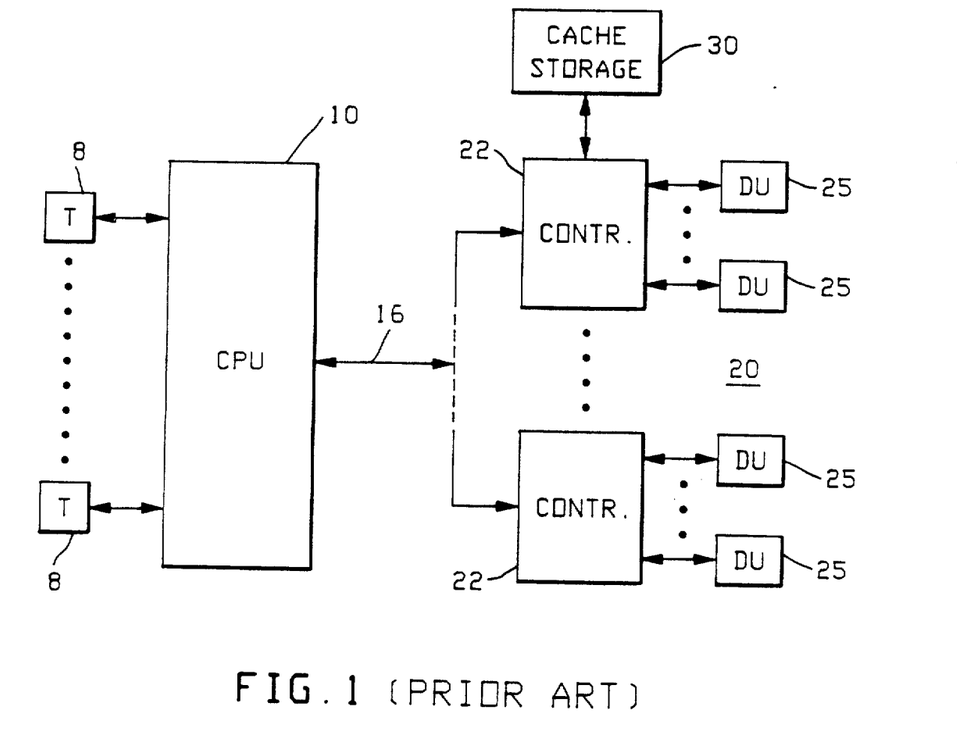
FIG. 1 is a block diagram of a conventional data processing system including a central data processor, terminals, and a disk system.

With reference to FIG. 1, the present invention will be illustrated as applied to a data processing system in which a relatively large number of terminals 8 communicate with a central processing unit 10 interfaced to a conventional disk system 20 via a channel 16. The disk system 20 typically includes one or more disk controllers 22 and a plurality of disk units 25 cooperating therewith. The disk system 20 may also include cache storage 30. Typically, the terminals 8 generate transactions, each of which requires service from the central processor 10 which in turn causes the processor to communicate with the disk system 20. A single transaction, for example, may require ten or more I/Os.

As is well known, a disk unit 25 typically stores data on magnetic media, which are arranged in concentric cylinders. The physical unit is typically constructed using multiple disks joined by a rotating spindle. The cylinder intersects a disk and forms a track on the disk, each track typically consisting of a preformatted number of sectors. When a disk I/O is requested, the request typically includes the disk unit number, the beginning sector number, and the length of the transfer.

A read/write head is used to transfer data to a disk unit 25 (write) or from a disk unit 25 (read). The head must be positioned at the correct track; if not, a seek request is sent to the unit. This request physically positions the read/write arm over the desired track. The data cannot be transferred until the data on the track revolves under the read/write head. This delay is called latency. Delay in the movement of data to or from the disk unit is the transfer time.

From the central processing unit 10, disk I/Os are issued through the channel 16 to the controllers 22 which handle the protocol between the disk unit 25 and the channel 16. The service time for each controller 22 includes the controller processing time to issue commands to a disk unit 25, the latency, and the transfer time. Since each controller 22 is shared by many disk units 25, requests for controller service for one disk unit may conflict with service requests for others.

Figure 2:
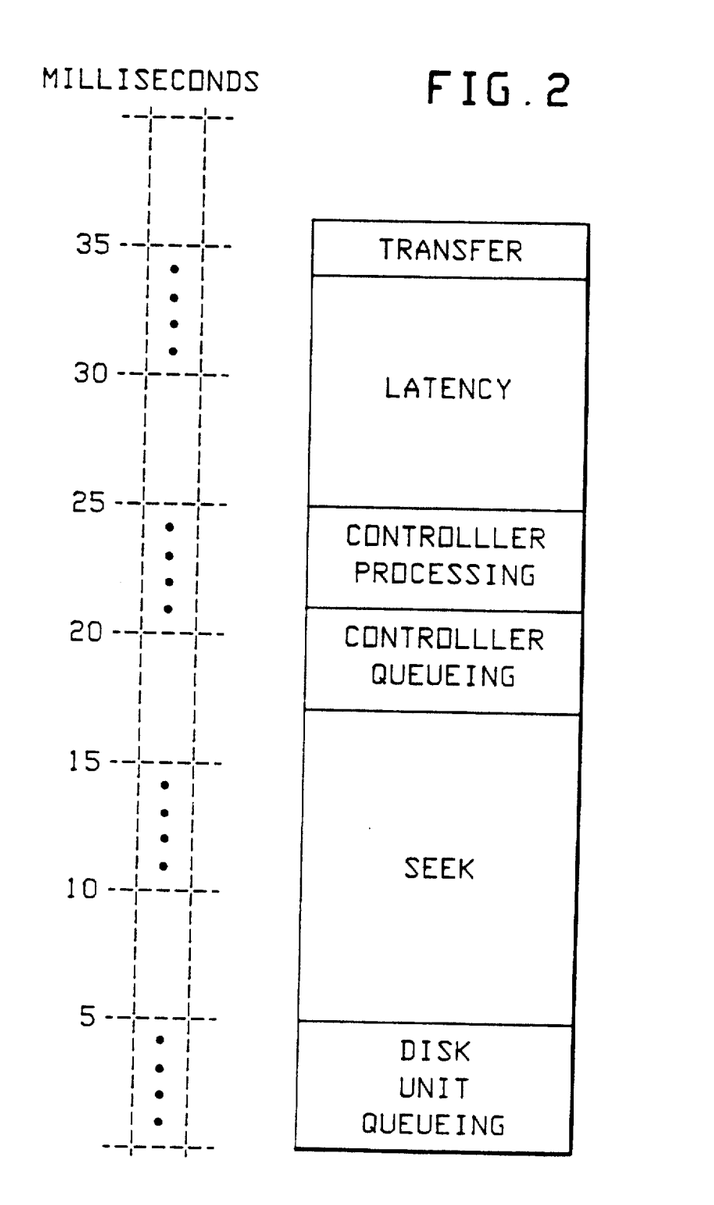
FIG. 2 is a diagram illustrating typical delays occurring in a conventional disk system.

Several hundred users at terminals 8 may be actively executing transactions simultaneously, and they will compete for computer resources. As is conventional, the competition for disk resources is handled by queues provided in each controller 22. During typical operation, each issued disk I/O received from the channel 16 is passed to a respective disk unit queue in a respective controller 22. In the particular embodiment being considered, it as assumed that only one I/O may be active for a specific disk unit. Thus, if multiple I/Os are issued for a disk unit 25, all but one remain in the respective disk unit queue. When the active I/O is completed, the request at the head of the disk unit queue then becomes active. If a seek is necessary, it is issued and there is a wait for the disk unit to respond that the seek has been completed. When the seek is completed (or if there is no seek at all), the I/O is queued for controller processing in the controller queue. Each controller 22 services one I/O at a time from the head of its queue. As illustrated in FIG. 2, the overall delay of the I/O is the sum of the delays resulting from disk unit queuing, seek, controller queuing, controller processing, latency, and transfer. When the transfer is completed, the I/O is completed and the next I/O in the disk unit queue 17 becomes active.

The manner in which a model may be provided in accordance with the invention for a disk system of the type described above having delays such as indicated in FIG. 2 will next be described. For this purpose, the disk system will be considered to be an open queueing network with a finite waiting queue between the primary (disk unit) and secondary (controller) servers. Disk delays are formulated as sets of stochastic processes which represent the I/O delay time from the I/O start (placing the I/O in the disk unit queue) to the I/O completion. An illustrative analysis is presented below, wherein the prime (') is used to specify the stochastic processes used to described the controller performance. Although this illustrative analysis assumes a single controller, it will be evident how it can be extended to a configuration having a plurality of controllers as illustrated in FIG. 1. Upper case denotes sets or vectors, while lower case denotes elements. For example, the variable $s_{ij}$ specifies the service received by the $j^{th}$ element to arrive at the $i^{th}$ disk unit queue, while $s'_k$ specifies the service for the $k_{th}$ arrival at the controller queue.

The I/O start times (A) form a renewal process consisting of independent identically distributed (i.i.d.) interarrival times with a finite mean and variance. The I/O seek delays (SK) are i.i.d random variables (r.v.) with a finite mean and variance. The controller service times (S') are the sum of the controller processing time (a constant) and i.i.d. r.v's from the distributions of latency times (uniform) and transfer times (arbitrary distribution with finite mean and variance). This illustration is simplified by assuming that all disk units are connected to a single controller. A second simplification concerns the controller processing required to issue the seek. The processing is aggregated into the controller time for latency and transfer.

The analysis is applied to a snapshot comprised of a fixed number of contiguous I/Os measured over a relatively short time period, such as 500 seconds. This provides the advantage of permitting vectors of individual Unit I/Os to be established. These I/Os are issued for I units. The sequence (A) can be arranged as a set of vectors, $A_i = 1.2, \ldots I$. where $A_i = a_{ij}, j = 1,2,\ldots n_i$ These vectors do not have equal numbers of elements. The number $n_i$ is a random variable representing the number of arrivals for the $i^{th}$ unit until m arrivals have occurred in the overall system. Each vector represents a finite real-valued stochastic process with an index set $j = 1,2,\ldots n_i$.

The corresponding I/O delays are a set of vectors, (D). The elements of these delay vectors are the sum of r.v.s for the vectors (W) and (S).

$$d_{ij} = w_{ij} + s_{ij} \quad (1)$$

The elements of (S) represent the "service time" for each arrival at the disk unit. This service time is the total delay between the time that the I/O becomes active and its completion. The elements of (W) are the waiting times until service begins for a unit's arrival.

Figure 3:
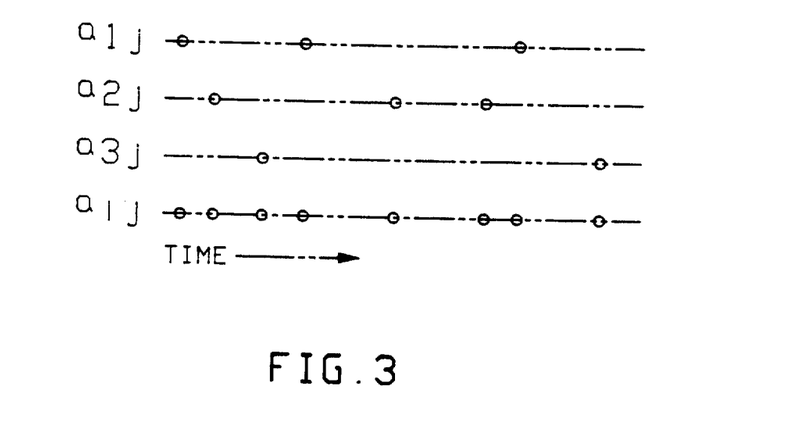
FIG. 3 is a graph illustrating the superposition of three arrival processes in a simulation model constructed using the disk delays formulated as sets of stochastic processes.

Since the elements of $A_i$ are i.i.d r.r.s and the vectors of (A) are independent, the superposition of the arrival processes is a distribution of i.i.d r.v.s. FIG. 3 represents the superposition of three arrival processes, which is notated as $a_{(ij)}$. Notice that the number of arrivals for each unit are not equal. The superposition is a stochastic process in which the arrivals of the three processes are ordered by their values.

The elements of (S) are the sum of three r.v.s:

$$\begin{align} s_{ij} &= sk_{ij} + w'_{(ij)} \\ i &= 1,2,\ldots, I \\ j &= 1,2,\ldots, n_i \\ (ij) &= 1,2,\ldots, m \end{align} \quad (2)$$

The elements of the sequence (W') are the waiting times for the unit's I/O at the controller queue. The elements of (S') are the service times at the controller, as previously defined. The values of the elements of (W') are a function of the arrival times at the controller, (A') and the service times (S'). The arrival process for this system is a superposition of the I vectors $C_i$ whose elements are defined as:

$$C_i = A_i + W_i + SK_i \quad (3)$$

The superposition of the arrival processes at the controller will be indicated by $(C_{(ij)})$, meaning that all arrivals at the controller are sorted by their value, as specified in (3). This is simplified by indicating the arrival process:

$a_k' = c_{(ij)}$

The order of arrivals at the controller, (A') is not necessarily the order of the superposition arrivals $a_{(ij)}$. This is due to the variability of the seek delay and the variability of the waiting time, $w_{ij}$ in the unit queue.

The waiting times at the controller, (W'), are defined using intermediate values, (U'), whose elements are defined as:

$$u'_k = s'_{k-1} - a'_k - [a'_{k-1}] \quad (4)$$

for $k = 1,2,\ldots m$

These values are then used to calculate the waiting times:

$$w'_k = \max(0, [u'_k + w'_{k-1}]) \quad (5)$$

The values of $W_i$ are found in a similar manner.

$$u_{ij} = s_{i,j-1} - a_{ij} - a_{u,j-1}] \quad (6)$$

for $j = 1,2,\ldots n_i$ and $$w_{ij} = \max(0, [u_{ij} + w_{i,j-1}]) \quad (7)$$

In accordance with the invention, an I/O disk simulation model is constructed using the disk delays formulated as sets of stochastic processes, as described above. Note that the stochastic processes are formulated with an index set of arrival position which is integer valued and consecutive. This offers the advantage of faster processing since each I/O will require a relatively small number of integer additions which can be performed at high speed by most data processors.

In order to st up the simulation model for a disk system configuration, the delays associated with the various components of the configuration must be determined. This is accomplished using well known benchmarking run on all available styles of units and controllers. In particular, simulation and statistical submodels were developed which made is possible for many simulation events to be replaced by a single functional evaluation.

For example, using benchmarking, controller processing time and latency distribution were derived for the simulation model in the following manner. A disk unit was configured on a single controller. An I/O was then issued to a random sector on a specific track. When the I/O completed, another I/O was issued to a different random sector on the same track. The resulting delays were found to have a uniform distribution with a minimum parameter and a maximum parameter. The minimum parameter represented the controller processing time with zero latency time. It was found that these two parameters uniquely define the uniform distribution of latency for the unit and the simulation model was constructed accordingly.

Of particular advantage was the use of benchmarking for deriving a statistical submodel which is used in the simulation model for deriving seek delay times. This was done by first obtaining the raw data in the table below by benchmarking a Unisys 9494-12 disk drive.

| Minimum Measured Seek Delay Time | |
|---|---|
| Milliseconds | Cylinders |
| 3.55 | 0 |
| 7.57 | 1 |
| 12.84 | 2 |
| 13.74 | 4 |
| 13.83 | 8 |
| 14.99 | 16 |
| 15.68 | 32 |
| 17.58 | 64 |
| 20.15 | 128 |
| 24.57 | 256 |
| 31.29 | 512 |
| 39.40 | 999 |

The cylinder number indicates the number of cylinders over which the read/write arm must move before the I/O operation beings (SEEK). Delay due to seek time is often the greatest single delay of an I/O and it is therefore important that it be accurately determined by actual measurements, such as these illustrated in the above table. Using these actual measurements and the regression model equation:

$$SEEK = B_1 z + B_2 z^2 + B_3 z^3 + b_4 z^4$$

wherein $z = \log$ (cylinders), the following coefficients were calculated for use in determining seek delays in the statistical submodel:

$B_1 = 4.45$
$B_2 = 7.39$
$B_3 = -2.99$
$B_4 = .49$
$B_5 = -0.02$

The minimum delay of 3.55 milliseconds measured with 0 cylinders is the minimum delay time for an I/O, which can be attributed to the controller processing time. It was found that the statistical submodel derived in the above manner was a reliable and accurate way of providing for determining seek delays in the overall simulation model since the number of cylinders over which the head had to be moved was determined to be the primary relevant factor.

Other important aspects of the invention involve the manner in which an I/O workload is provided for the overall simulation model constructed as described above. In accordance with the invention, I/O workload snapshots comprised of a fixed number of contiguous I/Os over a relatively short time interval derived from measuring the I/O workload of an actual operating disk system are captured in a file as an I/O trace using an input-output trace facility. For example, commercially available Unisys Corporation A Series computers have an IOTRACE facility which can be used for this purpose, A typical I/O trace of a snapshot may, for example, be comprised of 40,000 disk I/Os occurring over a 500-second interval during peak business periods on a customer's disk system.

Such a captured I/O trace is used to drive a simulation model which has previously been set up, as described above, to correspond to a particular disk system configuration (the parameters of which are chosen based on benchmarked results as also explained above). Typically, the I/O trace data includes, for each I/O in the workload, the start time when the I/O became active (placed in the controller queue), the disk unit for which the I/O is intended, the disk address and the length of transfer. The simulation model is adapted to read each I/O and its associated data in the I/O trace file and, based thereon, to simulate the delays for seek, transfer, latency and controller processing for the particular configuration taking into account disk and controller queuing.

Figure 4:
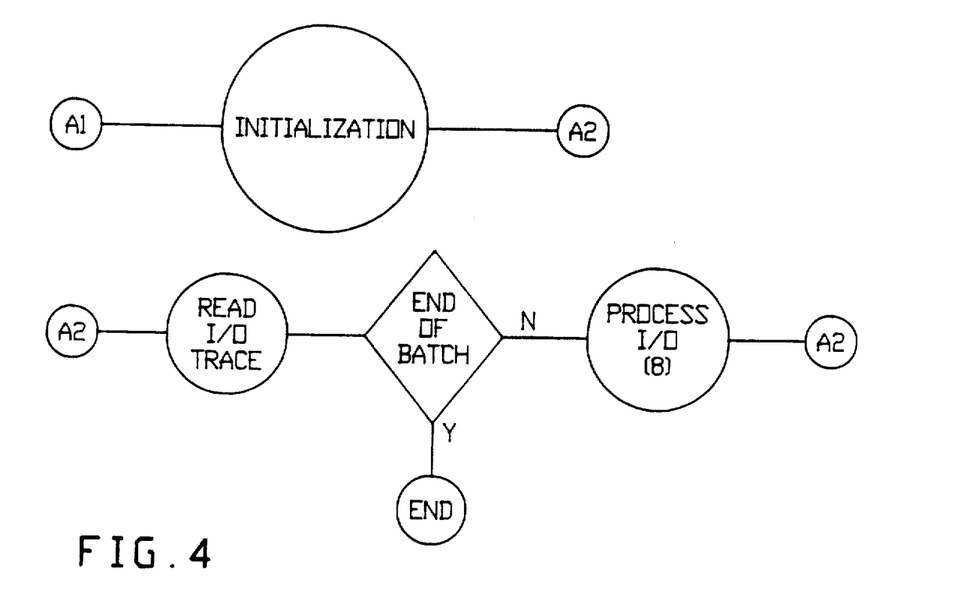
FIGS. 4-7 are flow diagrams representative of an exemplary simulation model in accordance with the invention.

The modeling of an I/O trace by the simulation model is illustrated by the flow diagrams of FIGS. 4–7. An I/O trace is modeled by grouping I/Os in the I/O trace into batches. For example, an I/O trace of 40,000 I/Os may be grouped into forty batches, each batch containing 1000 I/Os. The overall performance measures are, the weighted average of the results of the individual batches. The flows of FIG. 4–7 illustrate how a single batch is modeled. Details of each of the flow charts of FIGS. 4–7 are presented below:

Simulate I/O batch [A]—FIG. 4

A1—Begin a new batch
INITIALIZATION—Initialize counters, including:
LOWARRIVAL:=O;
READ I/O TRACE—Read the next record in the IOTRACE file.
END OF BATCH
 Yes
  Batch is complete
 No
  go to PROCESS I/O [B]

Figure 5:
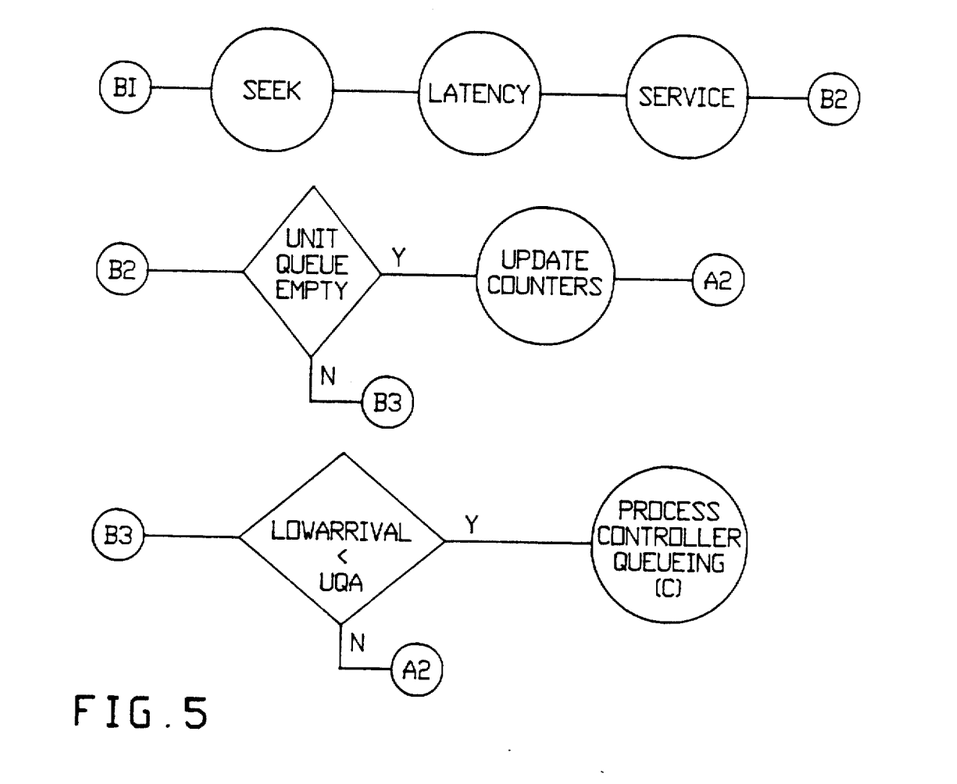

Process I/O [B]—FIG. 5

In this and subsequent flows, the following subscripts will be used:
I—I/O Number
U—Unit used by I/O
C—Controller used by I/O
F—Minimum arrival time for all active I/Os
F'—next I/O for the unit used by F
SEEK—Calculate SEEK delay using:

$$USEEK_F = B_1 z + B_2 z^2 + B_3 z^3 + B_4 z^4$$

where $z = \log(\text{cylinder}_I)$
LATENCY—Calculate delay for latency using:

$$CQL_F = \text{rotation}(U(0,1))$$

where $U(0,1)$ is a uniform random variable form 0 and 1
rotation = the full rotation time (about 16.67)
SERVICE—Calculate service time as:

$$CQS_F = \text{TRANSFERTIME} + \text{CONTROLLER PROCESSING}$$

UNIT QUEUE EMPTY
 Yes
  UPDATE COUNTERS:
  $UQU_F := SAVES_U - (UQA_F - SAVEA_U)$
  $SAVEU_U := UQU_I$
  $UQW_F := MAX((SAVEW_U + SAVEU_U), O)$
  $SAVEW_U := UQW_I$
  $SAVEA_U := UQA_I$
  $CQA_F := UQA_I + SAVEW_U + USEEK_I$
  $I := I + 1$
  GO TO Simulate I/O Batch [A2]
 No
  GO TO B3
LOWARRIVAL $UQA_I$
 Yes
  GO TO Process Controller Queueing [C]
 No
  $I := I + 1$
  GO TO Simulate I/O Batch [A2]

Figure 6:
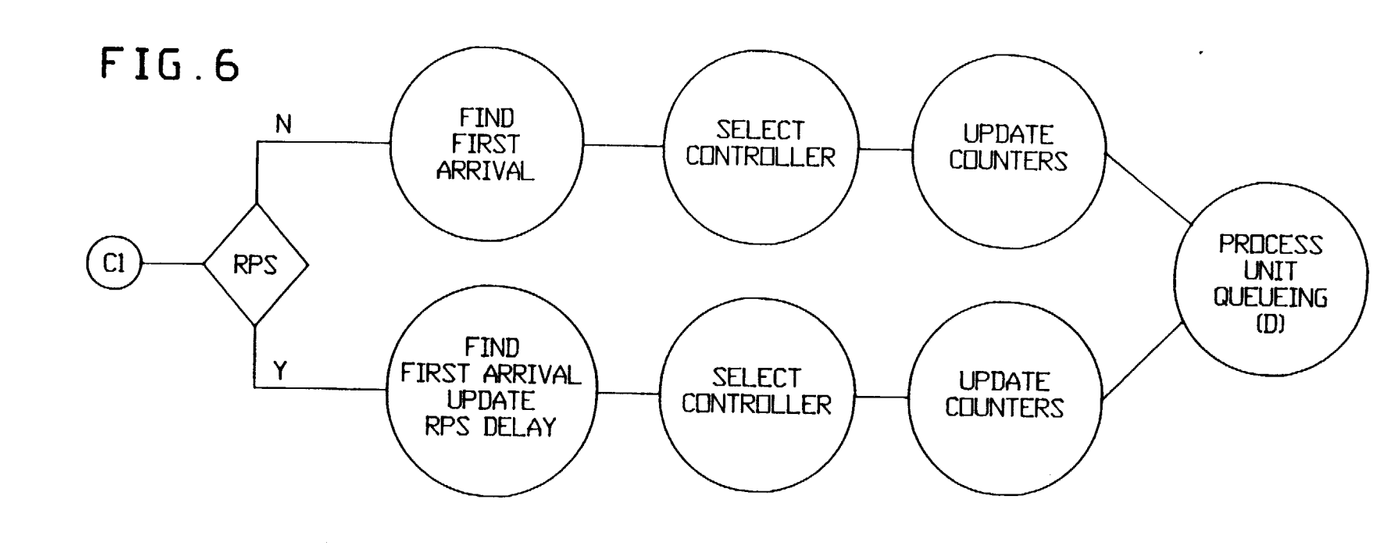

Process Controller Queueing [C]—FIG. 6

RPS
 Yes
  FIND FIRST ARRIVAL where FIRST ARRIVAL = minimum $(CQA_C)$
  UPDATE RPS DELAY, if RPS "slip" occurs, RPS:=RPS + rotation
  SELECT CONTROLLER
  UPDATE COUNTERS:
  $SAVEA_C := CQA_F$
  $SAVES_C := CQS_F$
  GO TO Process Unit Queueing [D]
 No
  FIND FIRST ARRIVAL, where FIRST ARRIVAL = minimum$(CQA_C)$ SELECT CONTROLLER
UPDATE COUNTERS:
$CQU_F := SAVES_C - (CQA_F - SAVEA_C)$
$SAVEU_C := CQU_I$
$CWQ_F := MAX((SAVEW_C + SAVEU_C), 0)$
$SAVEW_C := CQW_F$
$UQS_F := SAVES_{C + SAVEWC} + USEEK_F$
GO TO Process Unit Queueing [D]

Figure 7:
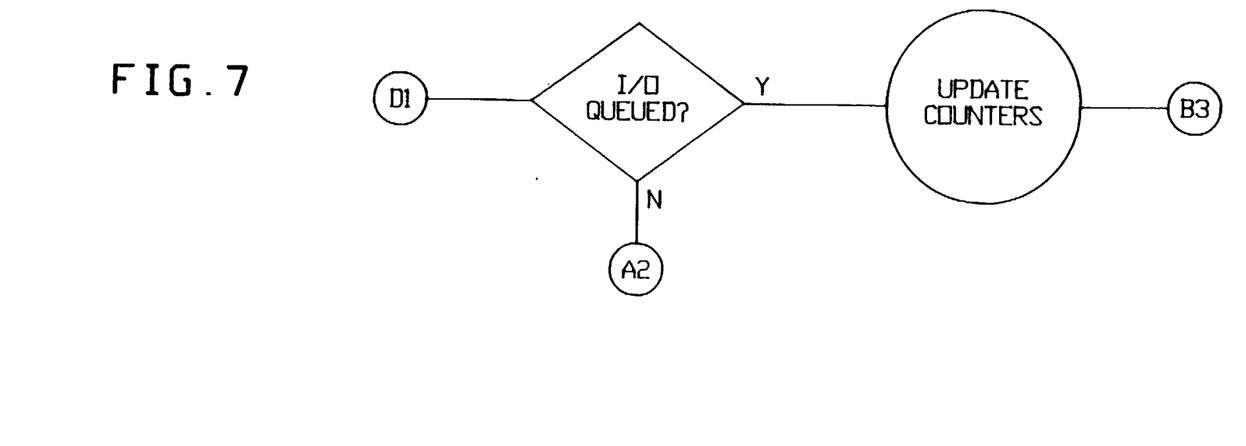

Process Unit Queueing [D]—FIG. 7

$SAVES_U := UQS_F$
I/O QUEUED
 Yes
  UPDATE COUNTERS
  $UQU_F := SVES_U - (UQA_F - SAVEA_U)$
  $SAVEU_U := UQU_F$
  $SAVEA_U := UQA_F$
  $UQW_F := MAX((SAVEW_U + SAVEU_W), 0)$
  $SAVEW_U := UQW_F$
  $CQA_F := UQA_{F + SAVEWU} + USEEK_F$
  LOWARRIVAL := $CQA_F$
  I := I + 1
  GO TO Process I/O [B3]
 No.
  GO TO Simulate I/O Batch [A2]

Figure 8:
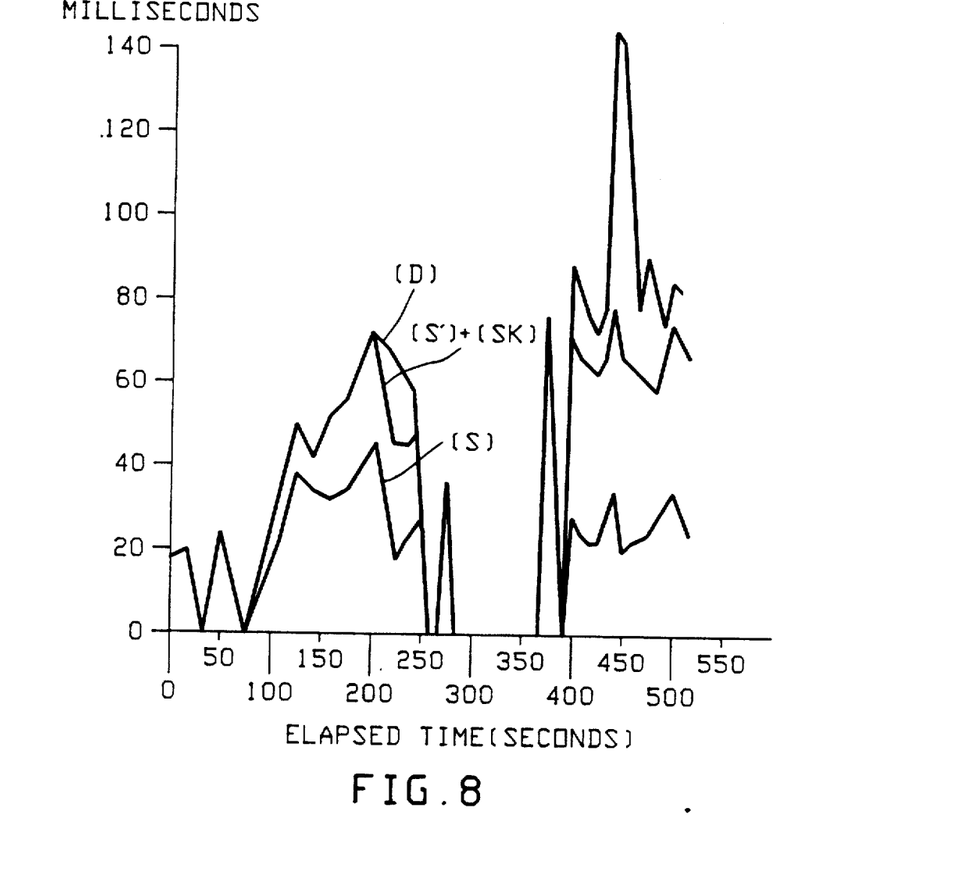
FIG. 8 is a graph illustrating typical output of a simulation model in accordance with the invention.

A typical output of the simulation model in response to an I/O trace snapshot is illustrated in FIG. 8 which shows a time series of I/O delays established by grouping the 40,000 total I/Os of the snapshot into forty batches of 1000 I/Os each, as described previously. The three curves show, for each batch, the I/O service time (S')+(SK), the service time (S) for each I/O arrival at a disk unit, and the overall delay (D), Specific definitions of (S'), (SK), (S), and (D) were previously provided herein in connection with the illustrative analysis of the formulation of disk delays as sets of stochastic processes. It has been found that the use of batches of I/Os, significantly enhances the resulting performance information that can be obtained, since, as illustrated in FIG. 8, results obtained on a batch basis can reveal performance characteristics which would not be recognizable on an overall basis.

A specific exemplary program which may be used for implementing the flow charts of FIGS. 4–7 is presented at the end of the specification. Also note that this program illustrates how other available disk system components, such as a cache storage, can be incorporated into the simulation model by providing a call to the appropriate algorithm.

Figure 9:
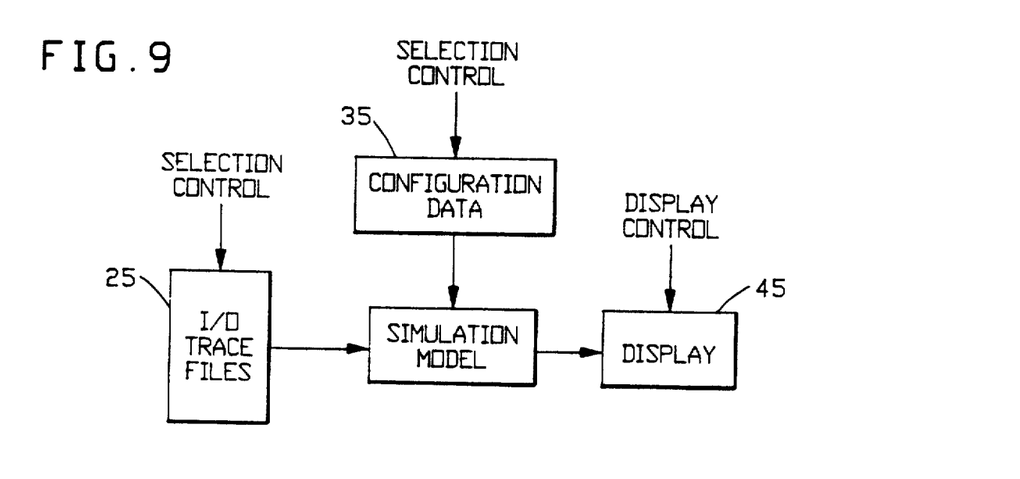
FIG. 9 illustrates how a simulation model in accordance with the invention can be employed to permit an I/O system user (customer) to explore the effects on performance of changing the I/O system configuration.

Reference is next directed to FIG. 9 which illustrates how a simulation mode, provided as exemplified above, can be employed to permit an I/O system user (customer) to explore the effects on performance of changing the I/O system configuration.

Block 25 in FIG. 9 represents stored I/O trace files corresponding to one or more snapshots of actual measured I/O workloads which can be employed for driving the simulation model 20. For example, an I/O workload snapshot file may be created using the IOTRACE facility of an A series Unisys computer to collect a 500-second I/O snapshot, comprised of 40 batches of 1000 I/Os each, during peak period operation of an actual customer system. A selection control is provided for selecting the particular I/O trace file and the number of batches to be used to drive the simulation model 25 during a simulation model run. An intensity control is also provided which permits a user to explore the effect on performance of an increased I/O workload rate simply by providing for selectively controlling the rate of arrival of I/Os provided by the selected I/O trace file. Both of these selection and intensity controls are typically manually controllable.

Block 35 in FIG. 9 represents stored configuration data obtained, for example, by benchmarking available types of disk units and controllers. A selection control (which is also typically manually controllable) permits a particular I/O system configuration to be selected for a simulation model run by setting up the parameters of the simulation model to correspond to the selected configuration as described previously. Besides providing simulation model parameters corresponding to the selected controllers, disk units and their interconnections, the selected configuration data may also include parameters corresponding to other selected I/Of components to be employed in the configuration, such as the size of a cache and the cache algorithm, if a cache is to be included in the selected configuration.

As mentioned previously, the simulation model output from a simulation model run, in response to a selected I/O workload snapshot and a selected configuration comprises performance statistics (e.g., disk unit and controller delay times as well as overall delays) which may be specific with respect to a particular batch or batches (see FIG. 5), as well as being based on the weighted average over the total number of batches. The weighting used is based on the I/O arrival rate. For example, if the average seek time of a disk unit was 16 milliseconds during a two I/Os per second batch and 10 milliseconds during an eight I/Os per second batch, the average seek time is $$\frac{(16 \times 2) + (10 \times 8)}{(8 + 2)} = 11.2 \text{ milliseconds.}$$

As shown in FIG. 9, the output of the simulation model 20 is applied to a display 45 having a display control in order to provide for controlling the format and contents of the displayed (or printed) performance data produced by s simulation model run.

It is to be understood that the present invention is not to be considered as being limited to the particular embodiments disclosed herein, since many modifications and variations can be made without departing from the true spirit and scope of the invention.

What is claimed is:

1. A method of using a data processor for providing predicted operation of an I/O system comprised of one or more controllers and one or more storage units cooperating therewith, said I/O system having a plurality of operating delays, said method comprising:

programming said processor to provide a simulation model of said I/O system constructed such that said delays are formulated as sets of stochastic processes having settable delay parameters;

selectably setting said settable delay parameters by operator control of said simulation model to correspond to said I/O system taking into account said controllers and said storage units and their interconnection;

applying to said simulation model signals representing a previously derived I/O workload comprised of a snapshot of I/Os; and producing an output from said simulation module in response to said I/O workload, said output being indicative of said predicted operation;

said storage units including a disk device and said simulation model including a statistical submodel which is used by said simulation model for deriving seek delay times for said disk device, said statistical submodel providing a seek time for an I/O operation based on the number of cylinders over which the disk transducer is required to be moved for that I/O operation.

2. A method of using a data processor for providing predicted operation of an I/O disk system comprised of one or more controllers and one or more storage units cooperating therewith, said I/O disk system having a plurality of operating delays, said method comprising:

programming said processor to provide a simulation model of said I/O system constructed such that said delays are formulated as sets of stochastic processes having settable delay parameters, said stochastic processes being formulated with an index set of arrival position which is integer valuedf and consecutive;

applying to said processor signals representing selectable configuration data containing delay parameters associated with various types of controllers and storage units usable in said I/O disk system;

selecting under operator control an I/O system configuration from said selectable configuration data;

setting said settable delay parameters by operator control of said simulation model to correspond to said selected I/O system configuration;

providing selectable I/O workload snapshot data comprised of I/O workload snapshots obtained by measuring actual I/O workloads experienced by an I/O system;

selecting under operator control an I/O workload snapshot from said selectable I/O workload snapshot data;

driving said simulation model with the selected I/O workload snapshot; and producing an output from said simulation model in response to said selected I/O workload snapshot, said output being indicative of said predicted operation;

said storage units including cache storage and said simulation module accounting for said cache storage by using an algorithm representative of cache storage operation.

3. The method in accordance with claim 1, wherein the stochastic processes are formulated with an index set of arrival position which is integer valued and consecutive.

4. The method in accordance with claim 1 or 2, including the step of displaying the output of said simulation model.

5. The method in accordance with claim 2, wherein said simulation model includes a statistical submodel.

6. The method in accordance with claim 1, wherein the I/Os of said snapshot are grouped into batches, and wherein said simulation model responds to said snapshot on a batch basis.

7. The method in accordance with claim 6, including the step of providing the output of said simulation on a batch basis as well as on an overall basis.

8. The method in accordance with claim 7, wherein said simulation model provides an output on an overall basis based on the weighted average of the results of the individual batches.

9. The method in accordance with claim 3, wherein said storage units also include cache storage, and wherein said simulation model is adapted to account for said cache storage by using an algorithm representative of the performance of said cache storage.

10. A method of using a data processor for providing predicted operation of an I/O disk system comprised of one or more controllers and one or more storage units cooperating therewith, said I/O disk system having a plurality of operating delays, said method comprising:

programming said processor to provide a simulation model of said I/O system constructed such that said delays are formulated as sets of stochastic processes having settable delay parameters;

applying to said processor signals representing selectable configuration data containing delay parameters associated with various types of controllers and storage units usable in said I/O disk system;

selecting under operator control an I/O system configuration from said selectable configuration data;

setting said settable delay parameters by operator control of said simulation model to correspond to said selected I/O system configuration;

providing selectable I/O workload snapshot data comprised of I/O workload snapshots obtained by measuring actual I/O workloads experienced by an I/O system;

selecting under operator control an I/O workload snapshot from said selectable I/O workload snapshot data;

driving said simulation model with the selected I/O workload snapshot; and producing an output from said simulation model in response to said selected I/O workload snapshot, said output being indicative of said predicted operation;

said I/Os of said snapshot being grouped into batches, said simulation model responding to said snapshot on a batch basis as well as on an overall basis based on the weighted average of the results of the individual batches.

* * * * *